United States Patent

[11] 3,536,046

| [72] | Inventor | Dominic M. Lippi |
| | | Luverne, Minnesota |
| [21] | Appl. No. | 698,805 |
| [22] | Filed | Jan. 18, 1968 |
| [45] | Patented | Oct. 27, 1970 |
| [73] | Assignee | A.R. Wood Manufacturing Company |
| | | a corporation of Minnesota |

[54] COMBINATION FEEDER AND WATERER FOR HOGS
3 Claims, 5 Drawing Figs.

[52] U.S. Cl. .................................................. 119/51.5, 119/56, 119/75
[51] Int. Cl. .................................................. A01k 5/00
[50] Field of Search .......................................... 119/51, 52, 56, 80, 51.5

[56] References Cited
UNITED STATES PATENTS

| 1,258,069 | 3/1918 | Weyeneth .................... | 119/53.5 |
| 3,340,852 | 9/1967 | Nilsen ......................... | 119/75 |
| 2,652,026 | 9/1953 | Iddings ....................... | 119/56 |
| 2,845,046 | 7/1958 | Hart ............................ | 119/75 |
| 2,942,574 | 6/1960 | Golay .......................... | 119/51 |
| 3,049,094 | 8/1962 | Smith .......................... | 119/75 |
| 3,126,866 | 3/1964 | Kubota ........................ | 119/515X |

Primary Examiner—Aldrich F. Medbery
Attorney—Clarence A. O'Brien and Harvey B. Jacobson ABSTRACT: A hopper assembly including an auger shaft disposed along the base wall of the hopper. The auger shaft is rotated by means of a ratchet pulley wheel about which is entrained an actuating cable. The auger shaft displaces animal feed along the base wall of the hopper and discharging it therefrom. Disposed beneath the hopper is a trough which receives the feed after being dispensed from the hopper. A water valve is orientated above the trough, the valve being actuatable by the prodding of a feeding animal's head.

Patented Oct. 27, 1970
3,536,046
Sheet 1 of 2
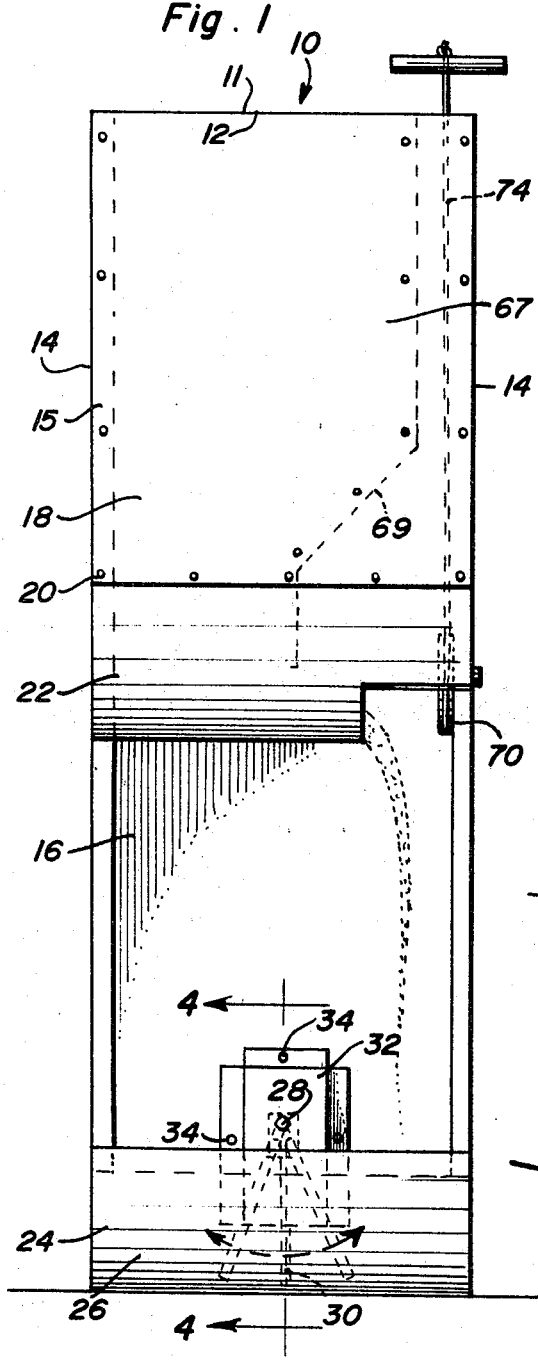
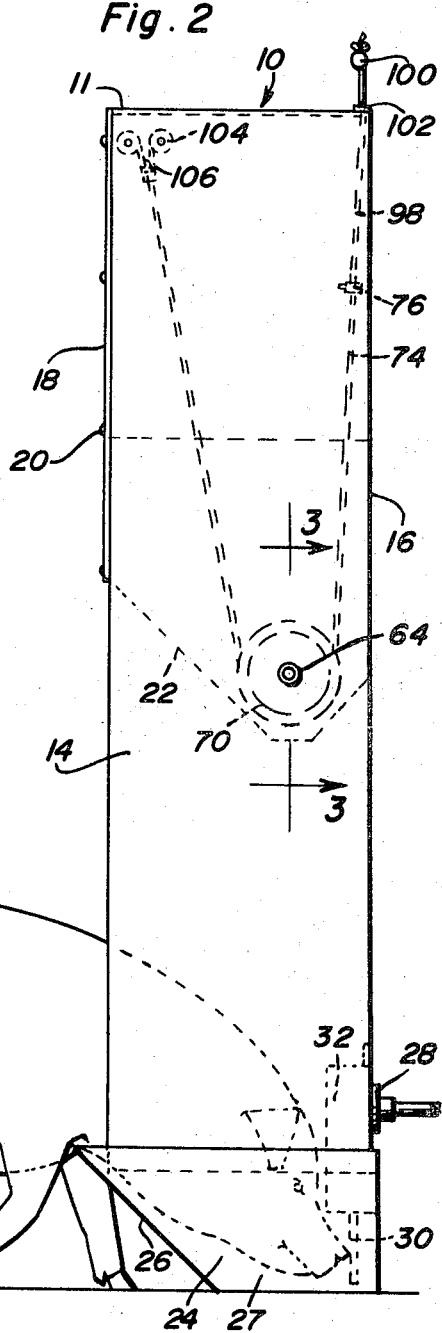
Dominic M. Lippi
INVENTOR.
BY Clarence A. O'Brien
and Harvey B. Jacobson
Attorneys Patented Oct. 27, 1970 3,536,046

Dominic M. Lippi
INVENTOR.

BY *Clarence A. O'Brien*
*and Harvey B. Jacobson*
Attorneys

COMBINATION FEEDER AND WATERER FOR HOGS

The present invention relates to the field of animal feeders and more particularly to a combination feeder and waterer for hogs.

Until the present time there has never been a truly satisfactory feeding system designed for the farrowing house. Present systems of farrowing include employment of a farrowing crate enclosing a sow 1 week before she farrows until 4 to 6 weeks after she farrows. The sow receives her feed and water right in the crate. This is a very critical time for the sow and the feeding system must be designed to accommodate her needs. It is important that the feeding system be designed so that the amount of feed can be controlled as the sow's requirements differ from time to time. A prior practice includes the hand feeding of the sows which becomes a considerable chore due to separate weighings for each sow. Certain prior art devices include a system for premixing water and feed which presents the feed in a more palatable form for the sow. However, these previous devices have failed to regulate the amount of water in the mix in accordance with the immediate desires of the sow. Still other devices have sought to rectify this situation by providing a sow with separate supplies of feed and water. However, a great deal of feed is wasted as the sow moves from the feeder to the waterer inasmuch as she usually takes a mouth full of feed with her and scatters quite a bit of it on the floor.

In summary, the present invention includes a hopper for storing animal feed. An auger shaft is disposed within the hopper and displaces the feed therein through a discharge area in the hopper, the feed then falling into a receiving pan or trough below. The auger shaft is actuated by a ratchet pulley wheel, the pulley wheel being mounted concentrically with the auger shaft. The ratchet pulley wheel drives the auger in only one direction of rotation. A water valve is located below the hopper which may be actuated by the prodding action of a sow's snout. Thus, a sow may mix a given quantity of feed disposed within a trough with an amount of water as she desires. Accordingly, among the more salient objects of the present invention are to provide:

A hog feeder which permits the animal to mix a selected quantity of water with a quantity of feed previously deposited in a trough;

A valve assembly controlled by the pressure exerted by a sow's snout upon a nose paddle actuator;

A valve guard plate for protecting a valve assembly from damaging contact by a sow's head.

An animal actuated water valve which prevents further actuation by a sow should the level of water in a trough exceed a desirable quantity;

A ratchet pulley wheel assembly selectively keyed to an auger shaft when dispensing of feed from a hopper is desired; and A cable construction with adjustable stops thereon for permitting preselected quantities of feed to be dispensed from a hopper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front elevational view of the instant feeder and waterer.

FIG. 2 is a side elevational view of the device illustrated in FIG. 1.

Figure 3:
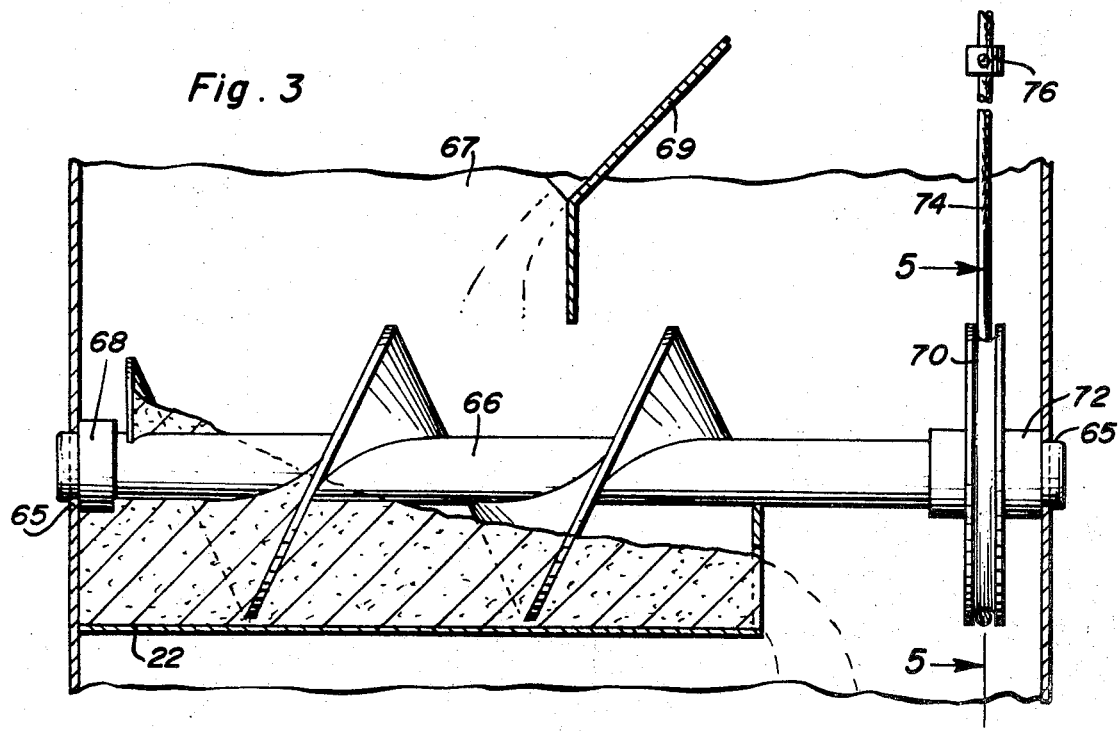
FIG. 3 is an exploded detailed view of the auger shaft and hopper base.

Referring specifically to the drawings, a preferred embodiment of the present invention is generally denoted by the reference numeral 10. As shown in FIG. 1, a polygonal housing 11 is provided which includes an open top 12 and side walls 14 which continue frontwardly in the form of a right angle overlapped corner of the material. The housing also includes a rear wall 16 and a front panel 18 extending to an intermediate length between the top and bottom of the housing. The panel is fastened to the overlapping material corner 15 by means of suitable fasteners 20. An inverted trough-shaped section 22 is disposed beneath the panel 18 and is attached thereto. The bottom wall of the section 22 extends approximately three-quarters the lateral distance between the side walls 14 thereby forming an exit from the inverted trough-shaped section. The base of the housing is supported upon a trough 24 including an upwardly and outwardly inclined front wall portion 26. The trough 24 receives water 27 which is to be consumed by a hog or the like in conjunction with feed dispensed from an upper portion of the housing as is made presently apparent.

Figure 4:
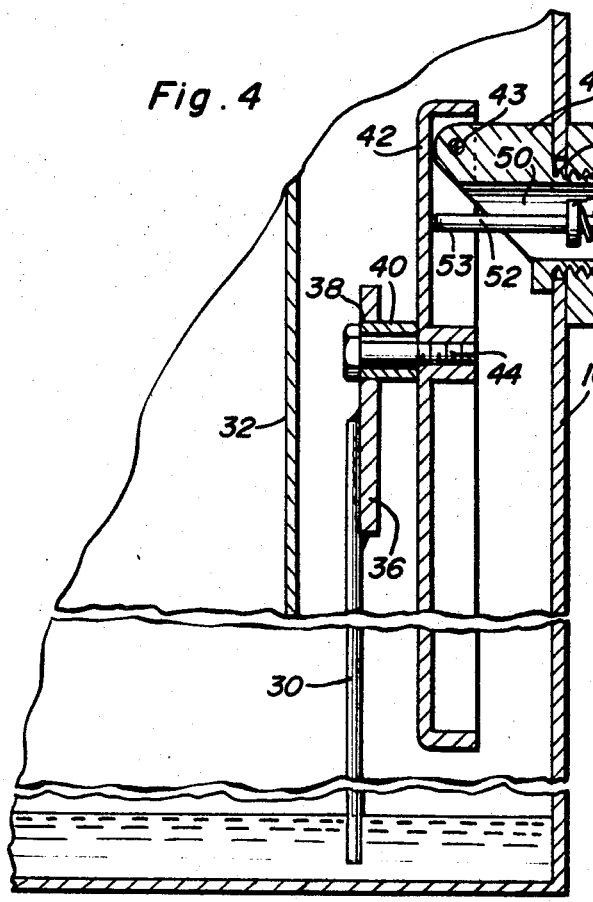
FIG. 4 is a longitudinal fragementary sectional view taken along a plane passing through section line 4—4 of FIG. 1 illustrating the present valve assembly in detail.

As seen in FIGS. 1 and 4, an animal actuated valve assembly 28 depends inwardly from the rear wall 16 of the housing. This valve assembly includes a swivel rod 30 which opens the valve 28 when prodded inwardly by the snout of a hog. The valve assembly 28 is protectively covered by a guard plate 32 fastened to the rear wall 16 by suitable fasteners 34. The positioning of the guard 32 over the valve assembly results in the exposure only of the swivel rod 30 thus preventing a hog from injuring valve assembly parts. The upper end of the rod 30 is attached to a plate 36, the plate contains an aperture 38 formed therein. A bushing 40 is positioned concentrically of the aperture 38, one end of the bushing inserted within the aperture, the opposite end of the bushing being positioned against an apertured bracket 42. The bracket includes a cotter pin connection between the bracket and the body 44 of the valve assembly 28. The rear wall 16 includes an aperture 46 formed therein for receiving a threaded connector portion 45 which is integrally connected with the body portion 44 of the valve assembly. the connector extending rearwardly through the aperture 46. A nut 48 secures the valve assembly body in the aperture 46. A central portion of the valve body includes a cylindrical chamber 50 therein for receiving a valve stem 52, one end portion of which extends outwardly of the valve assembly and contacts the rearward surface of the bracket 42 at a point denoted by the reference numeral 53 in FIG. 4. An intermediate point on the stem 52 includes a disklike stop 54 for retaining a compression spring 56 within the chamber 50 and biasing the valve stem 52 outwardly in the closed position. The inward end 58 of the valve chamber 50 includes a conical valve seat 60 which receives a similarly conical valve member 61 connected with the stem 52. The rearwardly extending threaded portion 64 of the threaded valve body portion 45 receives an interiorly ribbed tubular hose end 62.

Referring to FIG. 3 of the drawings, an auger shaft 66 is shown which displaces feed stored in the hopper 67, the latter formed by a left side wall 14, an intermediate wall partition 69 disposed intermediate the outward side walls 14. The wall portion 69 is characterized by a vertical portion appending to a downwardly and inwardly inclined section which in turn appends to a vertically downward section terminating within the frustoconical section 22. The auger shaft 66 is journaled from apertures 65 formed within the side walls 14. The left interior end section of the shaft 66 is fixed to a concentrically disposed cylindrical bearing 68, the outward surface of the bearing sliding against the inward surface of the left side wall 14. The right end portion of the shaft 66 includes a pulley wheel 70 mounted concentrically of the shaft 66. A rotatable sleeve 72 is disposed intermediate the shaft 66 and the center bore of the pulley 17. It will be appreciated that the sleeve 72 is adapted to rotate freely between the shaft 66 and the pulley wheel bore. A cable 74 is entrained about the pulley wheel for a minimum of 340° and more typically 540°. The cable 74 includes limit stops 76 along the rearward length thereof, to limit the displacement of the cable around the circumference of the pulley wheel.

Figure 5:
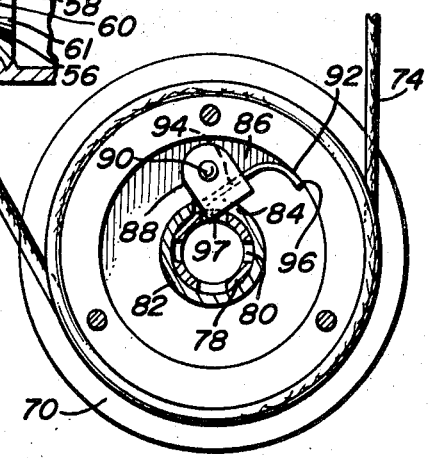
FIG. 5 is a sectional view of the pulley wheel taken along a plane passing through section line 5—5.

Referring to FIG. 5 of the drawings a detailed view of a ratchet assembly disposed radially inward of the pulley wheel is illustrated. An end shaft portion 78 on the auger shaft 66 includes four notches 80, each notch displaced 90° from an adjacent notch. The sleeve 72 upon which the pulley wheel 70 retates includes a notched segment 82 disposed radially outwardly of the notched shaft portion 78. The sleeve segment 82 includes a single notch 84. A central circuit web portion 86 includes a U-shaped dog 88 rotatably fastened thereto. The dog is free to rotate upon the confronting surface of the web due to the pin connection 90 connecting the dog with the web. A generally L-shaped spring clip 92 is received within the dog 94 along one end portion of the spring clip. The opposite end of the spring clip 92 rotatably bears against a cylindrical wall portion 96 defining the radially outward dimension of the web 86. Accordingly, it will be appreciated from studying the relation between the dog and the notches of the shaft 78 and the sleeve 82 in FIG. 5 that counterclockwise rotation of the pulley wheel caused by an upward pulling of the right cable length causes the centrally disposed edge 97 of the dog 88 to cam inwardly of the notch 84 in the sleeve 82 as well as a vertically disposed notch 80 of shaft portion 78. This engagement by the dog 88 and the associated notches causes a keying of the auger shaft 66, the sleeve 72 and the pulley wheel 70 as shown in FIGS. 3 and 5 of the drawings. Accordingly, rotation of the pulley wheel in this manner causes the auger shaft to rotate and dispense feed from the frustoconical base 22 of the hopper 67. Release of the cable acts to disengage the aforementioned keyed members as presently explained.

Referring to FIG. 2 of the drawings, it will be observed that a handle 100 is attached to the rearwardly disposed length or right side of the cable 74. This length of cable includes a mechanical stop 102 disposed immediately beneath the handle 100 for limiting the displacement of the handle inwardly of the housing. The opposite length or left side of the cable is biased upwardly by means of a constant force coil spring 104, having the ends thereof suitably fastened to the housing. The center of the coil spring 104 is connected by a suitable fastener 106 to the associated end of the cable 74. Accordingly, the coil spring exerts a tensile force upon the corresponding end portion of the cable 74.

Referring back to FIG. 5 of the drawings, it will be appreciated that a clockwise motion of the pulley wheel which becomes manifest upon release of the handle 100 causes an outward camming of the dog 88 from the correspondingly aligned notches 80 and 84. The unkeying of the shaft sleeve and pulley wheel causes the pulley wheel to rotate in an opposite sense by virtue of the tensile force exerted by the coil spring 104 as explained hereinbefore. This rotation of the pulley wheel occurs with respect to the sleeve 72 without a similar rotation of the auger shaft 66. Thus, when the handle 100 is released, the right cable length is retracted by virtue of a retraction of the coil spring. In addition, the auger shaft does not rotate in an opposite sense which would cause the undesirable displacement of the feed in the base portion of the hopper to an area removed from the hopper exit. Accordingly, the forward rotation restriction of the auger insures an efficient dispensing of feed from the hopper.

The level of the water to mix with the feed is controlled by the sow herself because she will not keep her nostril below the water. In use, hogs soon learn not to discharge too much water into the feed which serves as a safety measure to prevent flooding of the feed, trough and adjacent area of the floor. Further, animals other than hogs may employ this invention effectively and it also will enable the animal to obtain a drink of water at any time by actuating the valve.

The foregoing is considered as illustrative only of the principles of the invention. Further, since numerous modifications and changes will readily occur to those skilled in the art, it is not desired to limit the invention to the exact contruction and operation shown and described.

I claim:

1. An animal feeder for providing an animal with feed wetted by a quantity of liquid selected by the animal, the feeder comprising a trough, means for supplying feed to the trough animal actuated fluid admitting means mounted in a preselected position with respect to the trough for allowing feed mixing fluid to be admitted in response to prodding by the animal's head, and for allowing termination of fluid admission at will when the fluid level approaches his nostrils, the resultant maximum wetted feed being palatable to the animal.

2. The structure set forth in claim 1 wherein the means for supplying feed comprises a hopper disposed above the trough, an auger located in the hopper for displacing feed from the hopper, and means for driving the auger.

3. An animal feeder for providing an animal with feed wetted by a quantity of liquid selected by the animal, the feeder comprising a trough, means for supplying feed to the trough and animal actuated fluid admitting means for mixing fluid with the feed, the admitting means being positioned with respect to the trough for allowing a maximum level of fluid to be admitted as governed by the position of the animal's nostrils, the animal normally terminating fluid admission at will limited when the fluid level approaches his nostrils, the resultant maximum wetted feed being palatable to the animal, the means for supplying feed comprising a hopper disposed above the trough, an auger located in the hopper for displacing feed from the hopper, and means for driving the auger, the fluid admitting means comprising a valve assembly, a water inlet connection to said assembly, said assembly having an actuator extending outward, an actuator bracket hinged to the assembly and adapted to selectively depress the rod, a plate disposed parallel to the bracket in outward spaced relation thereto, a bushing located between the bracket and the plate to permit angular displacement of the plate, and a swivel rod mounted to the bar for displacement therewith when the rod is nudged laterally by an animal, swivelling of the rod serving to protect the rod from lateral breaking forces exerted by an animal.